(12) United States Patent
Sanders

(10) Patent No.: US 6,701,623 B2
(45) Date of Patent: Mar. 9, 2004

(54) COLLAPSABLE TRANSVERSE HANDLE FOR ELONGATED TOOL

(75) Inventor: Warren Sanders, Milan, TN (US)

(73) Assignee: Electrolux Home Products, Inc., Cleveland, OH (US)

( * ) Notice: Subject to any disclaimer, the term of this patent is extended or adjusted under 35 U.S.C. 154(b) by 0 days.

(21) Appl. No.: 10/043,434

(22) Filed: Jan. 10, 2002

(65) Prior Publication Data

US 2003/0126749 A1 Jul. 10, 2003

(51) Int. Cl.[7] ............................................. A01D 34/68
(52) U.S. Cl. ......................................... 30/276; 30/296.1
(58) Field of Search ............................... 30/276, 296.1, 30/298, 382; 56/12.7; 294/58; 172/13, 14

(56) References Cited

U.S. PATENT DOCUMENTS

| | | | |
|---|---|---|---|
| 4,179,805 A | | 12/1979 | Yamada |
| 4,282,652 A | * | 8/1981 | Ballas, Sr. .................... 30/276 |
| 4,364,435 A | | 12/1982 | Tuggle et al. |
| 5,279,102 A | | 1/1994 | Foster |
| 5,499,852 A | | 3/1996 | Seigendall |
| 5,613,354 A | | 3/1997 | Foster |
| 5,661,960 A | | 9/1997 | Smith et al. |
| 5,713,191 A | * | 2/1998 | Welton ....................... 56/12.7 |
| 5,740,613 A | * | 4/1998 | Swistun et al. ............... 30/276 |
| 5,970,692 A | | 10/1999 | Foster |
| 6,240,644 B1 | * | 6/2001 | Lawrence ..................... 30/276 |
| 6,327,781 B1 | * | 12/2001 | Sinclair et al. ................ 30/276 |

* cited by examiner

Primary Examiner—Hwei-Siu Payer
(74) Attorney, Agent, or Firm—Marc A. Hubbard; Munsch Hardt Kopf & Harr, P.C.

(57) ABSTRACT

A transverse handle for an elongated tool is preferably shipped attached to an elongated tool, but in a comparatively low profile, stowed position from which it can be placed relatively quickly and easily in an operating position by a consumer, preferably without the need for a tool. The handle is connected to the elongated tool with a mounting device that permits the handle to be pivoted between at least two positions: a stowed position, in which the handle is clamped and oriented approximately in the same direction as the elongated tool; and an operating position, in which it is clamped in a transverse orientation to the elongated tool.

8 Claims, 5 Drawing Sheets

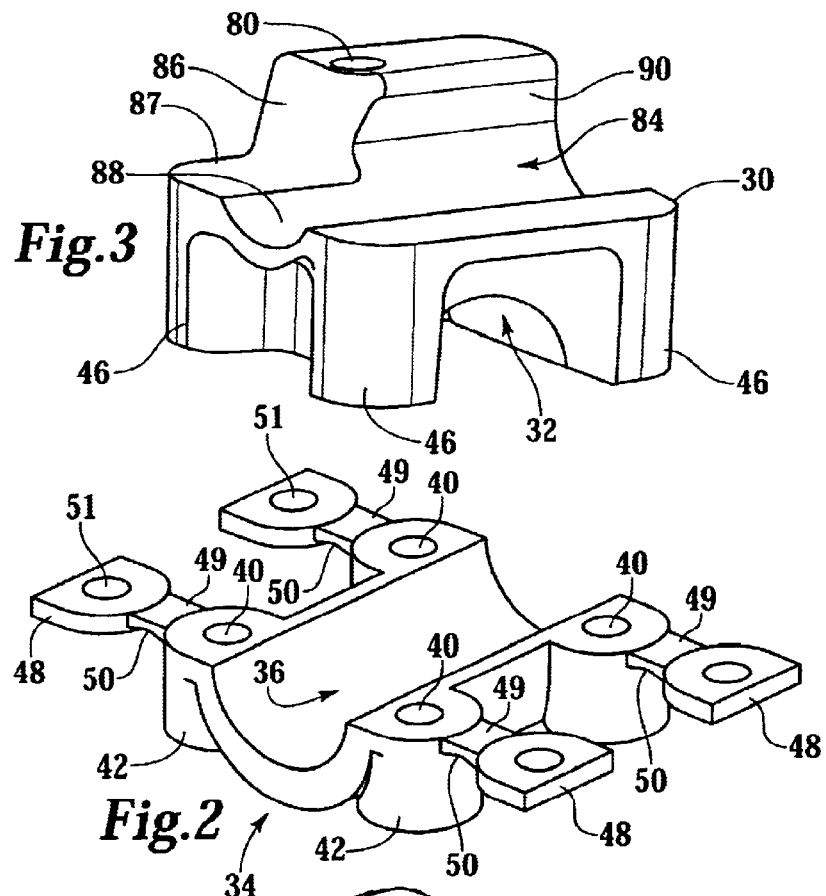
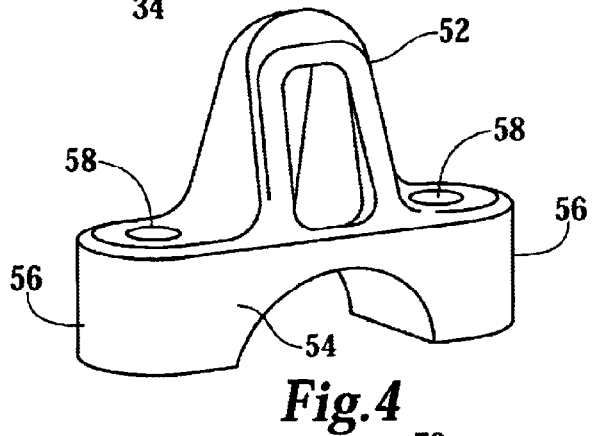
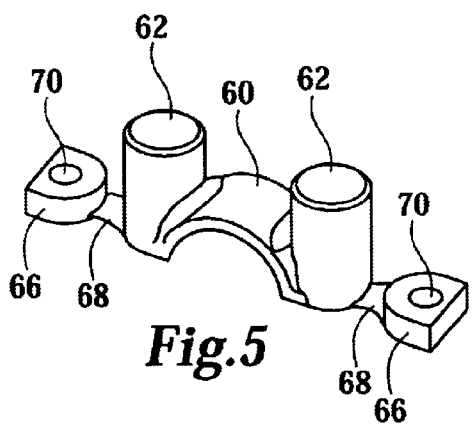
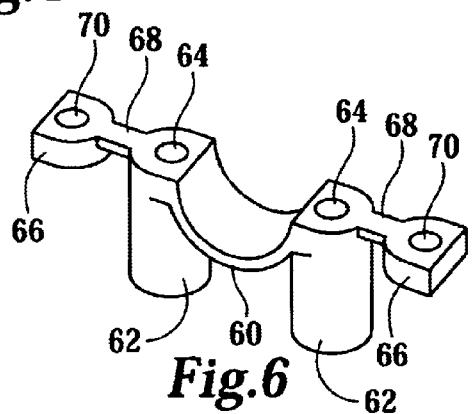

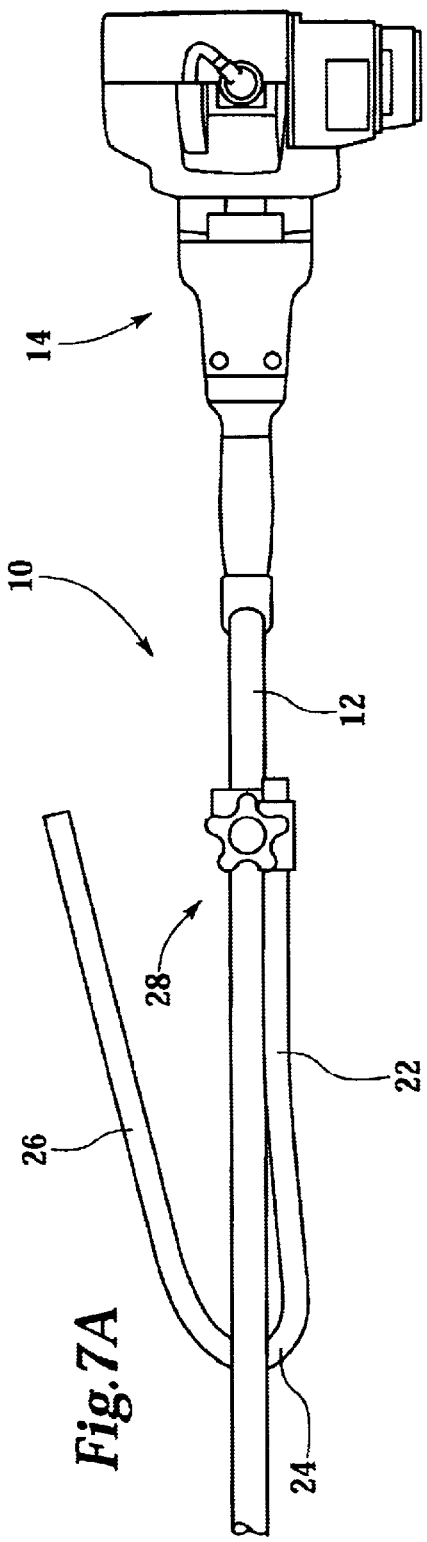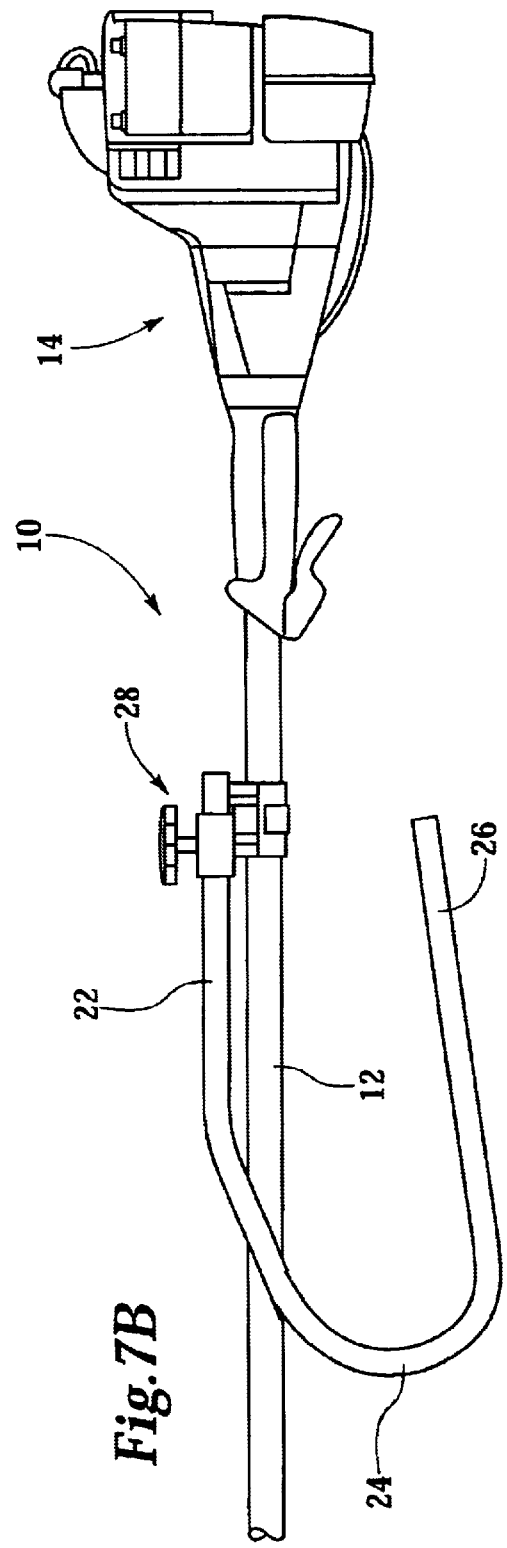

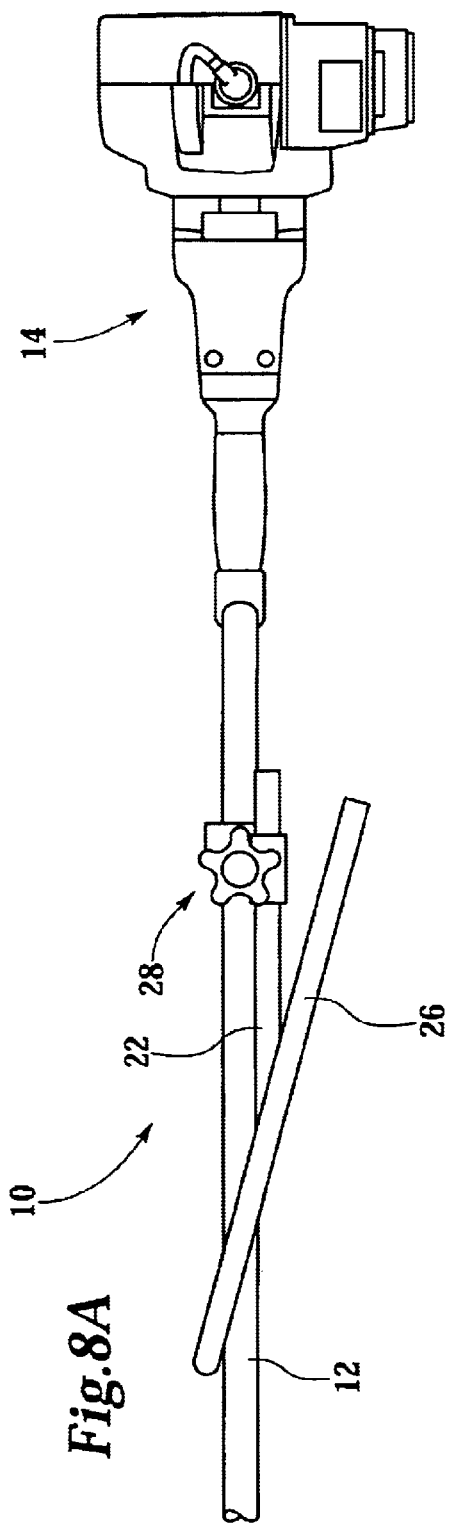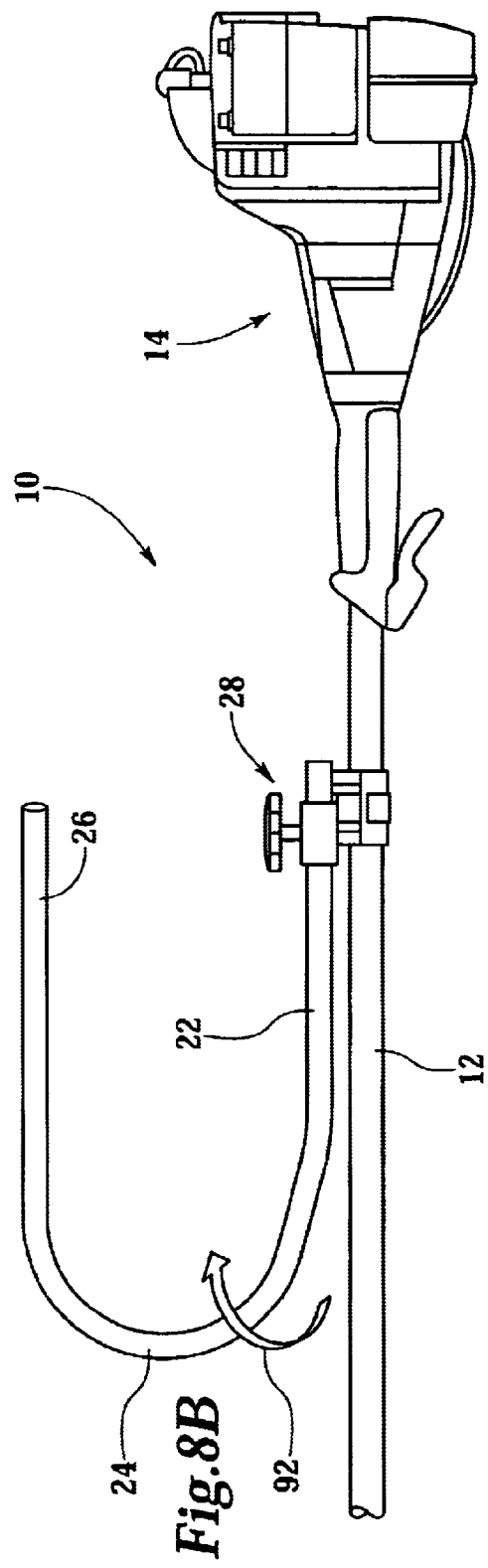

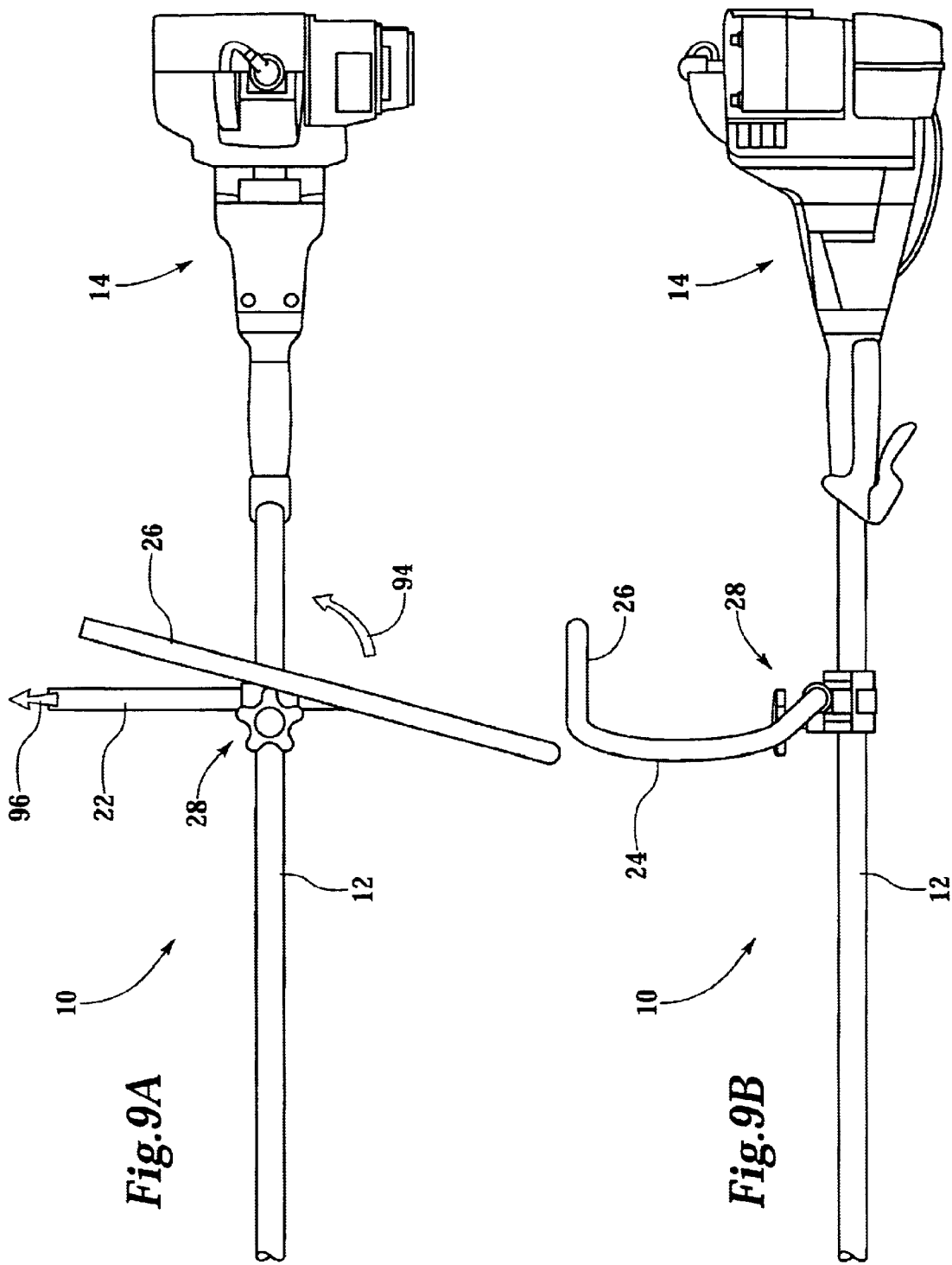

COLLAPSABLE TRANSVERSE HANDLE FOR ELONGATED TOOL

FIELD OF THE INVENTION

The invention relates generally to an elongated tool.

BACKGROUND OF THE INVENTION

Hand-held grass, weed and brush cutters and trimmers typically have an elongated boom supporting a rotating cutting element on one end of the boom. The boom permits the cutting element to be positioned near the ground while an operator of the tool stands. Power to rotate the cutting element is delivered by an electric motor or engine mounted at one end of the boom. To provide good balance, the rotary power source is attached to the end opposite the cutting element, and coupled to the cutting element through a drive shaft that extends down the hollow center of the boom. In some cases, the cutting element may be replaced with other types of working elements, such as blowers, tillers and other types of attachments that perform work for lawn and garden related tasks.

These tools will have two handles: a main handle which is generally oriented in a direction parallel to the boom; and an auxiliary handle that is generally transverse to the boom. If the tool is well balanced, a user will support most of the weight of the tool by the main handle. The auxiliary handle is used predominately to maneuver the end of the tool. If the tool is heavy or unwieldy, an operator may wear a harness, from which the tool is suspended.

For certain of these tools, it is preferred that the auxiliary handle extends outwardly from the tool's boom and separates an operator from a working end of the tool. For example, when a trimmer is held in a normal operating position, such an auxiliary handle is positioned between the operator and the tool's cutting head. These tools are normally shipped with the auxiliary handle disassembled and unattached to the tool. Although shipping the tool with the auxiliary handle unattached allows use of the relatively narrower or smaller packaging, it requires assembly prior to use. Customers prefer not to have to assemble a product once it is purchased, and may not assemble it properly.

SUMMARY OF THE INVENTION

The invention pertains to an improved transverse handle for an elongated tool. The handle is preferably shipped attached to an elongated tool, but in a comparatively low profile, stowed position from which it can be placed relatively quickly and easily in an operating position by a consumer, preferably without the need for a tool. The handle is connected to the elongated tool with a mounting device that permits the handle to be pivoted between at least two positions: a stowed position, in which the handle is clamped and oriented approximately in the same direction as the elongated tool; and an operating position, in which it is clamped in a transverse orientation to the elongated tool. The mounting device further allows, if desired, the handle to be rotated along an axis of an element of the handle that extends through the mounting device when loosened. Thus, it has particular advantage for "J" or "U" shaped handles and other types of handles with shapes that require rotation in addition to pivoting in order to achieve the most compact profile when in a stowed position.

Without limiting the scope of the invention, a preferred embodiment of a mounting device is comprised of a base and a clamp that surrounds a portion of the handle. The clamp is attached to the base in a manner that permits it to be pivoted with respect to the base, thus also allowing the handle to be pivoted with respect to the tool's primary axis. Tightening the clamp around the handle tends to prevent it from rotating or spinning and from moving in an axial direction. Tightening the clamp preferably also pulls the clamp against the base at the same time. Pulling it against the base impedes or interferes with pivoting of the clamp with respect to the tool. Loosening the clamp allows the clamp to more freely pivot, and thus also permits the handle to pivot with respect to the tool.

According to another aspect of a preferred embodiment, the base is shaped to assist with interfering with pivoting when the clamp is pushed or forced against the base in at least the operating position. To this end, the base preferably defines at least one recess or profile that is complementary to the clamp's exterior profile when the handle is in an operating position. Pulling the clamp into this recess tends to prevent the clamp from pivoting with respect to the tool and also the handle from rotating about its axis within the clamp. Thus, the handle is firmly held in position. A second recess may be formed and oriented to accommodate the position of the clamp when the handle is in a stowed position. By preferably making the first recess deeper than the second, the clamp falls into the second recess when the handle is rotated. The user need only then tighten the clamp. Thus, a purchaser is able take the elongated tool tool from a box, with the handle in a stowed position, pivot the handle toward an operating position, adjust it so that it is most comfortable, and then tighten the clamp without the use of tools or opportunity for mistake.

The forgoing summary is an example of an elongated tool embodying the invention in its preferred embodiment, and has as it purpose a brief summary and explanation of the advantages of various aspects of such a tool in its preferred form. It is not intended to limit the scope of the invention to the preferred form set forth. Rather, the scope of the invention is set forth in the appended claims.

BRIEF DESCRIPTION OF THE DRAWINGS

FIG. 2 is a perspective view of a clamp piece of a mounting device in the handle assembly of FIG. 1.

FIG. 3 is a perspective view of a base piece of the mounting device of FIG. 2.

FIG. 4 is an isometric view of a hook for a harness that is clamped to the trimmer of FIG. 1.

FIG. 5 is a bottom isometric view of a clamp piece for the hook of FIG. 4.

FIG. 6 is a top isometric view of the clamp piece of FIG. 5.

FIGS. 7a and 7b are side and top views of the trimmer of FIG. 1 with an auxiliary handle in a packed or stowed position.

FIGS. 8a and 8b are side and top views of the trimmer of FIG. 1 with an auxiliary handle in a mid-way position.

FIGS. 9a and 9b are side and top views of the trimmer of FIG. 1 with an auxiliary handle in an operating or installed position.

DETAILED DESCRIPTION

Figure 1:
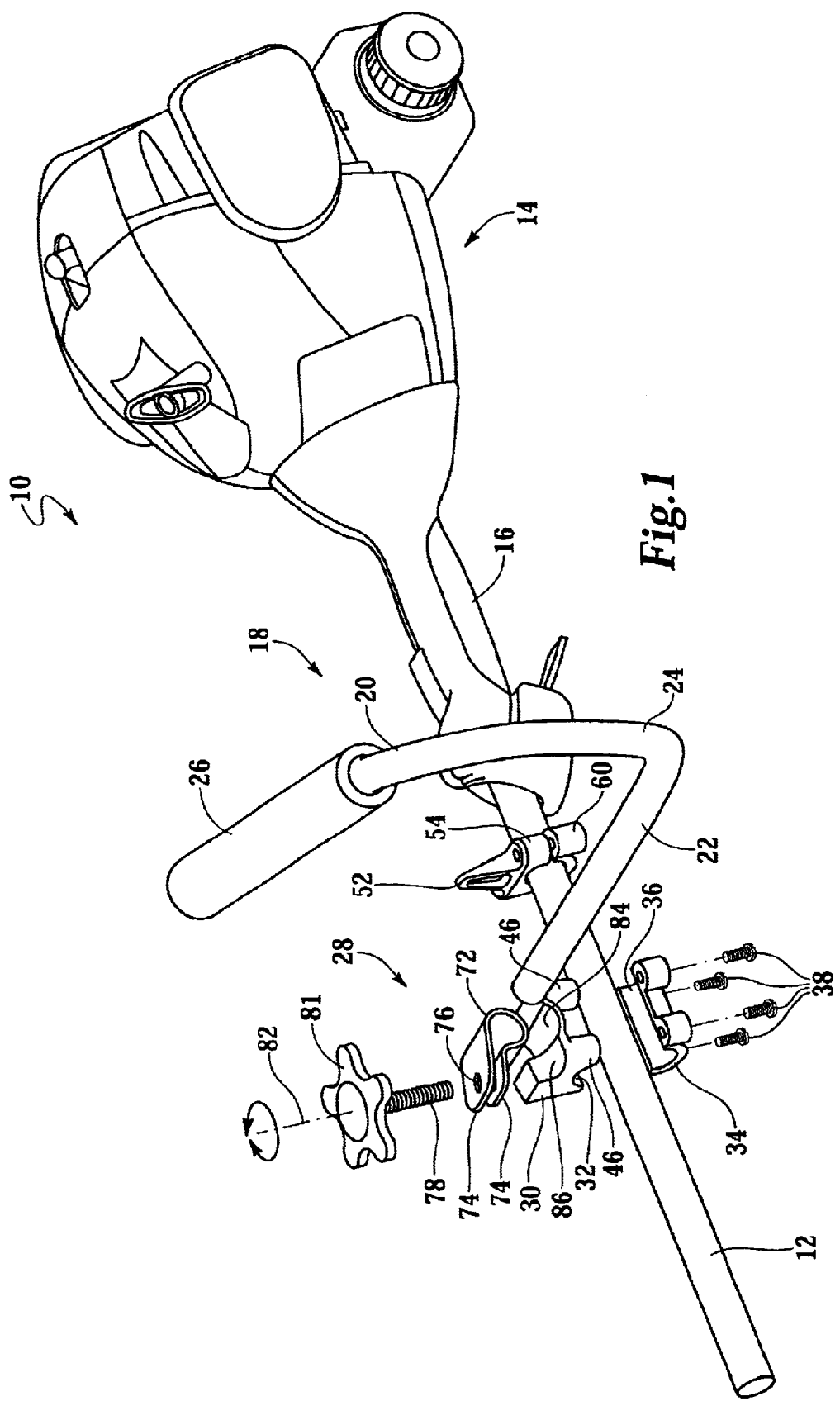
FIG. 1 is a perspective view of a grass trimmer with a "J" shaped handle, which includes an exploded view of the handle's assembly.

Like numerals are used for like parts throughout the figures.

Referring to FIG. 1, grass trimmer 10 is an example of an elongated tool of a type having a transverse handle for separating an operator of the tool from a working element. The trimmer includes an elongated, central element, namely boom 12. Grass trimmer 10 is of a gas-powered type, meaning that it has an internal combustion engine generally designed by the number 14. The engine is mounted on an upper end of boom 12 and drives a working element, not shown, mounted to a lower end of the boom, also not shown. The engine block is surrounded by a cowling or housing. Examples of working elements include flexible line heads and other moving or rotating cutting elements. Other sources of rotary power could be used in place of engine 14, including, for example, electric motors. Although placing a rotary power source on the upper end of boom 12 provides better balance in most cases, it can be, instead, mounted on the lower end of the boom, next to the working element. For cordless electric trimmers, a battery or other energy storage element may be mounted to the upper end of the boom and a motor is mounted on the lower end of the boom.

A main handle is placed near the upper end of the boom. In this example, the main handle is comprised of a gripping surface 16 that extends from a portion of the engine cowling and surrounds boom 12. Adjacent gripping surface 16 is a trigger for controlling speed of engine 14.

The trimmer also includes a second or auxiliary handle 18 that is generally oriented in a direction transverse to the trimmer's primary axis as defined, in this example, by its central elongated member, boom 12. In the illustrated embodiment, the handle is a type that falls generally within a category of handles sometimes referred to as "J bar" handles. It has two spaced apart segments, 20 and 22, which are roughly aligned in the same general direction. The direction of segment 20 is in this example offset so that it is not parallel with segment 22. This offset is intended to orient the handle so that it is in a more comfortable position for an operator. The two segments are joined by a third segment 24. In the preferred embodiment these segments are part of a common length of a bar-shaped element that is bent into the illustrated shape. However, the handle could also be formed by joining multiple discrete elements. Surrounding a portion of segment 20 is gripping surface 26, which will sometimes be referred to as an auxiliary gripping surface in order to distinguish it from gripping surface 16, which will sometimes be referred to as the main gripping surface. Segment 22 is connected to boom 12 by clamp assembly 28. Using a J-bar handle or similar handle permits the position of gripping surface 26 relative to the boom to be adjusted by pivoting the handle about the axis of segment 22. Pivoting the handle changes the relative distance between gripping surfaces 16 and 26, as well as the relative distance of auxiliary gripping surface 26 from boom 12. Like other bar handles, handle 18 can also be slid in and out of clamp 28 to adjust the position of the auxiliary gripping surface.

Referring now to FIGS. 1–3, clamp assembly 28 includes a base 30 that is mounted on or attached to boom 12. It is preferred to attach the base to the boom using a clamp, as shown in the figures. However, it could instead be attached by the use of one or more fasteners, such as screws or rivets. It is preferred, however, that the base be used as, in effect, one half of a clamp. In the illustrated embodiment, it has a bottom surface that complements the shape of the boom. For example, it is preferred to have semi-circular shaped recess 32 that partially surrounds the outer surface of boom 12. However, it may have other shapes, such as a "V" shape. Clamp piece 34 also has a portion 36 that is shaped to complement the boom. In the preferred embodiment, it has an arcuate cross-section, but it may have a "V" or other cross-sectional shape. Attaching the clamp piece to the base forces the base and clamp piece around the boom. Screws 38 are preferably used for attaching the two pieces. The screws are placed through holes 40 extending through bosses 42, and into threaded holes 44 formed in bosses 46 of the base. Bosses 42 and 46 are, in effect, flanges that allow two parts of the clamp to be pulled together using a fastener such as a screw.

Though recesses 32 and 36 of base 30 and clamp piece 34, respectively, are shaped to complement boom 12, they preferably accommodate booms having different cross-sectional dimensions, for example booms that are dimensioned at ¾" and 1. Booms of these two dimensions are commonly used for vegetation trimmers. The dimensions of recesses 32 and 36 in base 30 and clamp piece 34 can be slightly increased or decreased through bending to accommodate the boom. Each of these pieces are preferably molded from plastic and possess some resiliency. In order to take up the space between the bosses on the clamp piece and the base when a larger dimensioned boom is used, it is preferred that a spacer element be inserted. Therefore, the clamp piece 34 is preferably formed with a spacer 48 for each boss 42. The spacers take up space between bosses 42 of clamp piece 34 and bosses 46 on base 30 when the clamp is installed around a larger dimensioned boom 12. Each spacer is attached to a corresponding boss using a tab 49. Scores 50 on the tabs enable each tab to be easily bent so that hole 51 on the corresponding spacer aligns with held hole 40 in the boss. The score also permits the spacers to be easily removed and discarded if not required such as when using a boom of narrower cross-section.

Referring now also to FIGS. 4–6, an elongated tool may in some cases include or allow use of a harness, from which the tool is hung from an operator. Although a harness is not shown in any of the figures, harnesses are well known. In order to attach a harness to an elongated tool, such as trimmer 10 of FIG. 1, hook 52 may be provided. Hook 52 clamps to an elongated element, such as boom 12 of FIG. 1, of the tool. It is preferably made of molded plastic and is formed with an integrated clamp member 54 that has a shape to partially surround boom 12 of FIG. 1. The clamp member includes bosses 56, through which holes 58 are formed. The bosses act as flanges for attaching clamp member 54 to a second clamp member 60. Clamp member 60 also has a shape for partially surrounding boom 12 of FIG. 1. Like clamp member 54, clamp member 60 is also formed of plastic and includes integrally formed bosses 62 that act as flanges. Holes 64 are threaded to receive a screw extending through holes 58 of clamp member 54. Preferably, the shape of the clamp members are able to accommodate booms of different dimensions, such as ¾" and 1" diameter booms. Therefore, it is preferred to mold clamp piece 60 with a spacer 66 for each boss 62 in order to accommodate a larger dimensioned boom. Each spacer is attached to a corresponding boss with scored tab 68. Bending the tab at the score allows the spacer to be folded over a boss, with hole 70 in the spacer aligned with hole 64 on the boss. The spacers can also be easily trimmed and discarded if not required.

Referring again only to FIGS. 1–3, segment 22 of handle 18 is placed through clamp 72 that is connected with base 30 in a manner that permits it to pivot. Clamp 72 is preferably a single-piece clamp with a pair of flanges 74. However, a multiple piece clamp could be used, though such a clamp is more complex and expensive, and may not pivot as well in the way described below. Each flange has a hole 76, and the holes in the flanges are aligned to accept screw 78. This screw threads into hole 80 on base 30. The screw also preferably includes a knob 81 that provides leverage and/or a gripping surface for manually turning the screw without a tool.

Screw 78 acts as a pivot, which allows the clamp to swing or pivot about axis 82. Tightening the screw brings together flanges 74, which tightens the clamp around segment 22, thus preventing segment 22 from rotating or sliding axially with respect to the clamp. Tightening the screw also forces the clamp against base 30. The base includes at least two recesses, namely recesses 84 and 86 in the illustrated embodiment. The clamp 72 occupies recess 84 when handle 18 is transverse to boom 12, in an operating position. The clamp occupies recess 86 when the handle is in a low-profile, stowed position. It is preferred that recess 84 prevents clamp 72 from pivoting when the clamp is tightened.

In order to firmly hold clamp 72, recess 84 is contoured or shaped to block rotating movement of the clamp when tightened against base 20. It is, for example, lower or closer to boom 12 than recess 86. It consequently has a side wall 87 where recess 86 intersects recess 84. This side wall interferes with pivoting of the clamp when it is tightened against the base. Recess 84 also preferably has a rounded bottom 88 that complements the profile of the clamp and that extends the length of one side of the base. This rounded bottom resists rotation of the clamp when it is tightly secured against the base. It also has at one end a curved side wall portion 90 that extends around the side and partially over the top of the clamp, resulting in at least half of the clamp's outer circumference resting against the base. Should screw 78 become slightly loosened, recess will tend to hold the clamp in a proper position. Thus, the clamp may be loosened to permit the handle to be rotated and/or pushed in or out with respect to the clamp without the clamp pivoting. Recess 86, being higher, is much shorter and has relatively flat side walls or surfaces. Though there may be some friction between clamp 72 and recess 86, the recess primarily accommodates the clamp in a stowed position, that avoids having to remove the clamp to permit pivoting.

The positions of handle 18 on the trimmer in a stowed position, a mid-way position and an operating or installed position are shown, respectively, in FIGS. 7a and 7b, 8a and 8b and 9a and 9b. In FIGS. 7a and 7b, which are top and side views of trimmer 10, handle 18 is in a comparatively low profile position. The handle is substantially aligned with the axis of boom 12. Segment 22 is slid to a point near its end and the handle is rotated down, so that grip 26 is under the trimmer. The trimmer is preferably packed and shipped in this position. Handle 18 has been rotated up in FIGS. 8a and 8b, generally in the direction indicated by arrow 92 by loosening clamp assembly 28. However, it is still aligned with boom 12. If a straight, as opposed to "J" shaped bar is used it does not require rotation. FIGS. 9a and 9b show handle 18 having been pivoted in the direction of arrow 94 to a position transverse to boom 12 and, generally, trimmer 10. The handle has also been pushed in the direction indicated by arrow 96, with segment 22 of the handle sliding inside clamp 72 of clamping assembly 28 before it will be tightened.

What is claimed is:

1. An elongated lawn tool, comprising:

an elongated central support member having a working element on one end of the central support member, the working element being driven by a rotary power source;

an elongated handle; and a device for mounting the handle to the elongated member, the device permitting the handle to be rotated between at least two positions, the two positions including an operating position in which it is generally oriented transversely to the central support member and a lower profile stowed position in which it is generally oriented with the central member; the device including a clamp for tightening around a portion of the handle for preventing relative rotational and axial movement of the portion of the handle, the clamp being pivotally connected to a base mounted on the central support member, the clamp being tightened by a fastener that simultaneously tightens the clamp around the portion of the handle and forces the clamp against the base in at least one position for impeding relative movement of the clamp with respect to the base.

2. An elongated lawn tool, comprising:

an elongated central support member having a working element on one end of the central support member, the working element being driven by a rotary power source;

an elongated handle; and a device for mounting the handle to the elongated member, the device permitting the handle to be rotated between at least two positions, the two positions including an operating position in which it is generally oriented transversely to the central support member and a lower profile stowed position in which it is generally oriented with the central member; the device including a clamp for tightening around a portion of the handle for preventing relative rotational and axial movement of the portion of the handle, the clamp being pivotally connected to a base mounted on the central support member by a fastener that simultaneously tightens the clamp around the portion of the handle and forces the clamp into a first one of at least one recess formed in the base and complementary with the clamp, the recess corresponding to the clamp's position when the handle is in the operating position.

3. The elongated lawn tool of claim 2, wherein the base includes a second one of the at least one recess formed in the base and complementary with the clamp, the second one of the at least one recess corresponding to the clamp's position when the handle is in the stowed position.

4. The elongated lawn tool of claim 3, wherein the first and second ones of the at least one recess intersect, the fir one of the least one recess being deeper than the second one of the at least one recess.

5. An elongated lawn tool, comprising:

an elongated central support member having a working element on one end of the central support member, the working element being driven by a rotary power source;

an elongated handle; and a device for mounting the handle to the elongated member, the mounting device permitting the handle to be rotated between at least two positions, the two positions including an operating position in which it is generally oriented transversely to the central support member and a lower profile stowed position in which it is generally oriented with the central member; the device including a clamp for tightening around a portion of the handle for preventing relative rotational and axial movement of the portion of the handle and having two flanges that, when pulled together, tighten the clamp around the portion of the handle, the clamp being pivotally connected to a base mounted on the central support member by a screw extending through each of the two flanges and into the base, whereby tightening the screw simultaneously pulls together the flanges and forces the clamp against the base.

6. The elongated tool of claim 5, wherein the base includes a first one of at least one recess formed in the base and complementary with the clamp for preventing pivoting of the clamp when tightened against the bait handle, the first one of at least one recess corresponding to the clamp's position when the handle is in the operating position.

7. The elongated lawn tool of claim 6, wherein the base includes a second one of the at least one recess formed in the base for accommodating the clamp when in a position in which the handle is in the stowed position.

8. The elongated lawn tool of claim 7, wherein the first and second ones of the at least one recess intersect, the first one of the least one recess being deeper than the second one of the at least one recess.

* * * * *

UNITED STATES PATENT AND TRADEMARK OFFICE
CERTIFICATE OF CORRECTION

PATENT NO. : 6,701,623 B2  Page 1 of 1
DATED : March 9, 2004
INVENTOR(S) : Warren Sanders It is certified that error appears in the above-identified patent and that said Letters Patent is hereby corrected as shown below:

Column 4,
Line 12, please change "1." to -- "1." --;
Line 26, please delete "head";

Column 6,
Line 42, please change "fir" to -- first --.

Signed and Sealed this

First Day of June, 2004

JON W. DUDAS
*Acting Director of the United States Patent and Trademark Office*